United States Patent [19]

Hauri et al.

[11] Patent Number: 4,877,324
[45] Date of Patent: Oct. 31, 1989

[54] OPTICAL SIGHTING DEVICE WITH ILLUMINATED AIMING MARK

[75] Inventors: Bernhard Hauri, Staffelbach; Hans Etter, Ueberstorf, both of Switzerland

[73] Assignee: Kern & Co. AG, Aarau, Switzerland

[21] Appl. No.: 76,854

[22] Filed: Jul. 23, 1987

[30] Foreign Application Priority Data

Jul. 23, 1986 [CH] Switzerland ............... 2926/86

[51] Int. Cl.⁴ ........................................ G02B 23/10
[52] U.S. Cl. ................................ 356/251; 356/252; 33/241
[58] Field of Search ............... 356/251, 252; 33/241

[56] References Cited

U.S. PATENT DOCUMENTS

| | | |
|---|---|---|
| 2,476,340 | 7/1949 | Wallhausen . |
| 2,780,130 | 2/1957 | Mauer . |
| 3,813,790 | 6/1974 | Kaltmann ........................ 33/241 |
| 3,880,529 | 4/1975 | Althause et al. ................ 356/251 |
| 3,994,597 | 11/1976 | Calder et al. ................... 356/251 |

FOREIGN PATENT DOCUMENTS 65975 1/1983 European Pat. Off. .
179036 4/1986 European Pat. Off. .

Primary Examiner—Vincent P. McGraw
Assistant Examiner—S. A. Turner
Attorney, Agent, or Firm—Burns, Doane, Swecker & Mathis

[57] ABSTRACT

The optical aiming device may be mounted on firearms. It comprises a light-collecting rod (8) consisting of a phosphor material to illuminate a central circular spot (22) of an aiming mark (6). Such illumination passes through a truncated hollow cone (25) and is used for good ambient light conditions. For poor ambient light four tritium luminous cells (18, 19, 20, 21) are mounted around the truncated hollow cone (25). Each tritium cell illuminates one radial line component (23) of the aiming mark (6) via the external mirrored lateral area of cone (25). To adapt the brightness of the aiming mark to the brightness of the target the tritium luminous cells (18, 19, 20, 21) may be shifted on a circle around cone (25) with respect to the line components (23) of aiming mark (6).

8 Claims, 3 Drawing Sheets

OPTICAL SIGHTING DEVICE WITH ILLUMINATED AIMING MARK

BACKGROUND OF THE INVENTION

This invention relates to an optical aiming device with means for viewing a target field, means for defining an aiming mark and a partially-reflecting mirror for superimposing the aiming mark on the target field.

Such aiming devices are conventionally used as reflex sights for cannon and other firearms. In his German Offenlegungsschrift No. 2,122,251 William F. Steck of El Paso, Tex. discloses an aiming device with a housing for aiming and a light collecting rod mounted at one side of the housing to serve as an aiming mark. The image of one end surface of the light collecting rod is superimposed on the target field by two mirrors mounted on the housing. There is no means provided to change illumination for various ambient light levels or target luminosities.

Another reflex sight shown in U.S. Pat. No. 2,780,130 by Paul B. Maurer has an aiming mark illuminated by a fluorescent plastic rod which is superimposed on the aiming ray path by a semitransparent concave mirror. A filter with a high transmission for the light of the fluorescent plastic rod may be inserted in the viewing ray path to match very bright targets to the brightness of the aiming mark. An optical aiming device as shown in Swiss Patent No. 576,617 by J. A. I. Ekstrand has a reflex sight where the brightness of an aiming mark is adjustable by an electric lamp or by interchangeable attenuating filters for a betalight illumination.

A reflex sight shown in Swiss Patent No. 318,892 by Karl W. Lange has an illumination for an aiming mark which is adjustable by varying the separation between a beta emitter and a luminous colour. The apparent luminosity of the target may be adjusted by inserting absorbing filters in a revolving disk.

One object of the present invention is to provide an improved optical aiming device with a simple adjustable illumination of the aiming mark with a variable brightness by means of conventional commercially available sources of artificial light of constant brightness.

The invention is directed toward satisfying this and other objects with a device comprising at least one first source of artificial light to illuminate the aiming mark, reflecting means for directing the artificial light to the aiming mark and a partially reflecting mirror whereby the image of the aiming mark can be seen by an observer, viewing the target field, substantially at infinity. At least one of the elements first source of artificial light, aiming mark and reflecting means is movable with respect to the two other elements so that the illumination of the aiming mark or parts thereof varies at the motion.

According to one feature of the invention, the first source of artificial light is self contained, another source of light for illumination of the aiming mark comprises a phosphor that may be activated by daylight and one part of the aiming mark is illuminated by the other source of light comprising the phosphor and another part of the aiming mark is illuminated by the first source of artificial light.

According to another feature of the invention, the aiming mark comprises a central circular spot and several line components arranged radially around said central spot, the reflecting means for directing the artificial light of the first source to the aiming mark is constituted by the lateral area of a truncated hollow cone of which the small aperture is adjacent to the circular spot of the aiming mark and serves to pass the illumination from the other source of light that may be activated by daylight, said lateral area being metallized on its outer side and for each line component of the aiming mark one self contained source of artificial light being provided circularly movable around said truncated hollow cone so that the illumination of the line components via the metallized lateral area varies at a motion of the self contained sources of artificial light.

According to a third feature of the invention, the other source of light which comprises the phosphor has a rod-shaped phosphor which collects ambient light and transmits it directionally from its end surface adjacent to the circular spot of the aiming mark through said small aperture of the lateral area of the truncated hollow cone.

These objects and many other advantages of the present invention will be readily apparent to one skilled in the pertinent art from the following detailed description of a preferred embodiment of the invention and the appended claims when considered in conjunction with the drawings.

DETAILED DESCRIPTION OF A PREFERRED EMBODIMENT

Figure 1:
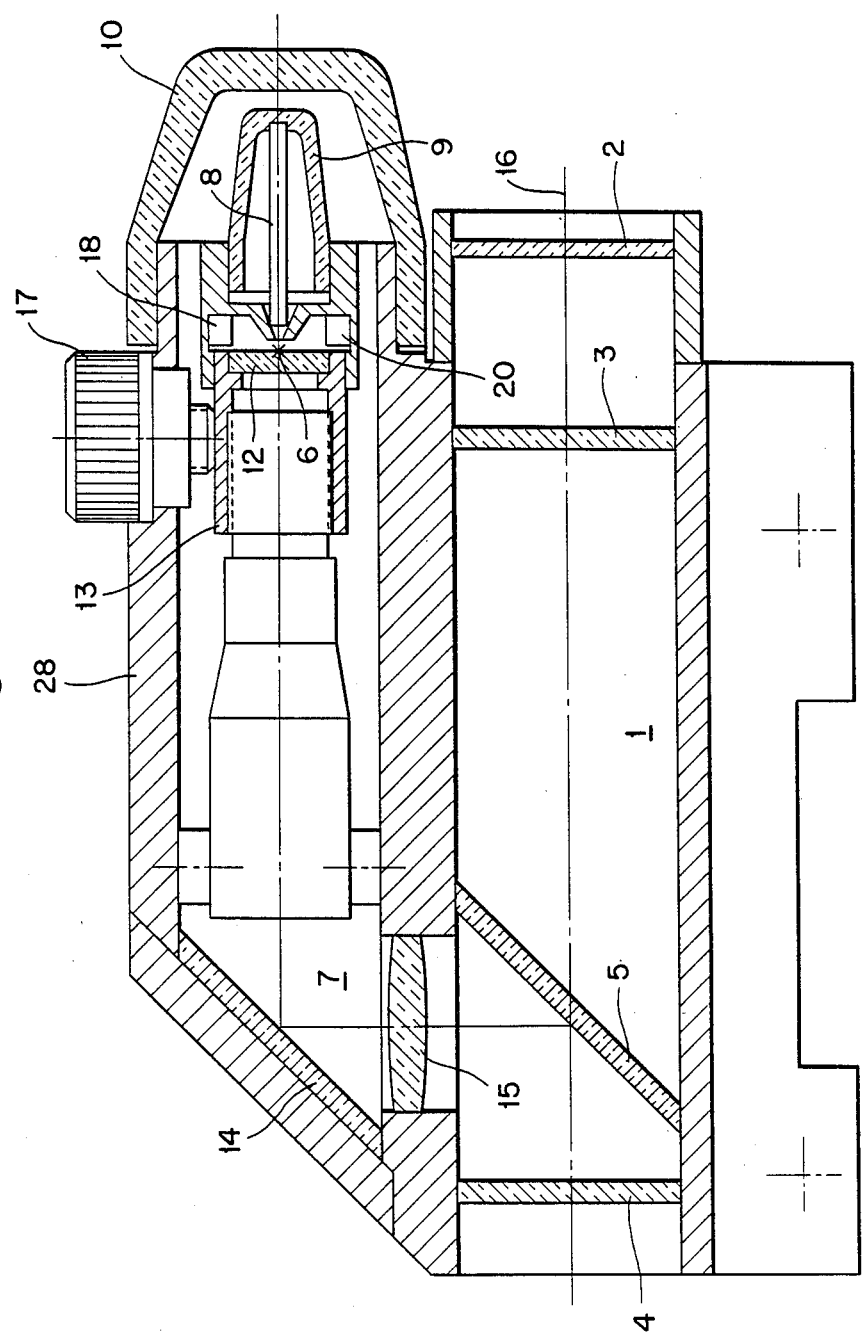
FIG. 1 is a longitudinal section of an aiming device according to the invention.

As shown in FIG. 1 a first tubular cavity 1 is provided for aiming at a target field at a distance to the right side of the device and not shown on the drawing. The cavity 1 is closed at its front side by two glass plates 2, 3 and at its back by a glass plate 4. Between the plates 3 and 4 a partially reflecting mirror 5 is inserted to project an aiming mark 6 into the cavity 1. The aiming mark is shown more in detail in FIGS. 3, 4 and 6.

Figure 2:
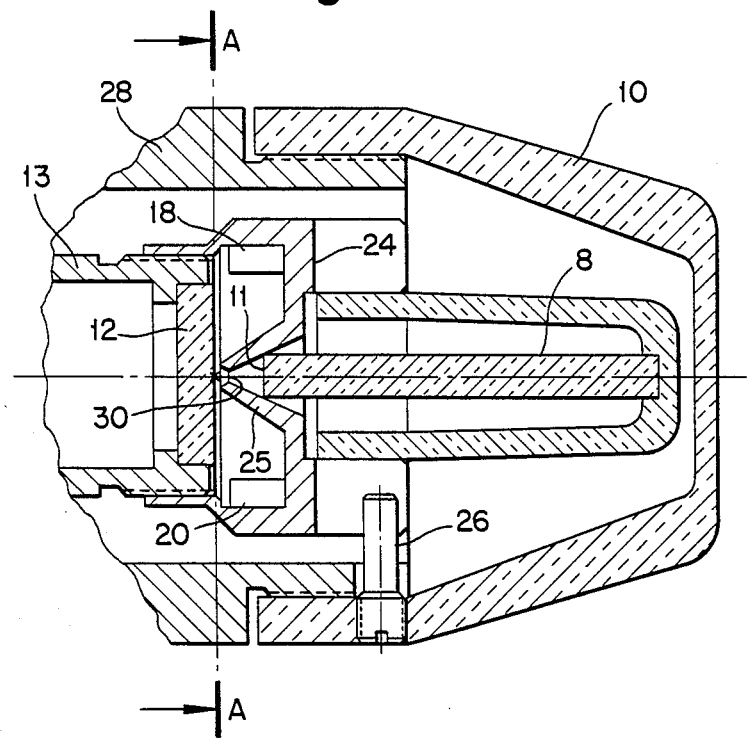
FIG. 2 shows the illumination of the aiming mark according to FIG. 1 more in detail.

A rod-shaped body 8 consisting of a phosphor material is mounted in a second cavity 7 above the cavity 1 to illuminate the aiming mark 6 with daylight. As shown in FIG. 2 in detail, rod 8 collects ambient light coming in through two transparent hoods 9, 10. This light is emitted again from the end surface 11 of rod 8 which is adjacent to the aiming mark 6. The aiming mark 6 is on a glass plate 12 mounted in a housing 13, and it is projected into the aiming ray path 16 within cavity 1 via a deviating mirror 14, a lens 15 and the partially reflecting mirror 5 so as to appear at infinity to an observer of the device. A horizontal and a vertical adjusting screw work on the housing 13 for adjusting the aiming mark 6, the vertical screw 17 only being shown in FIG. 1.

Figure 3:
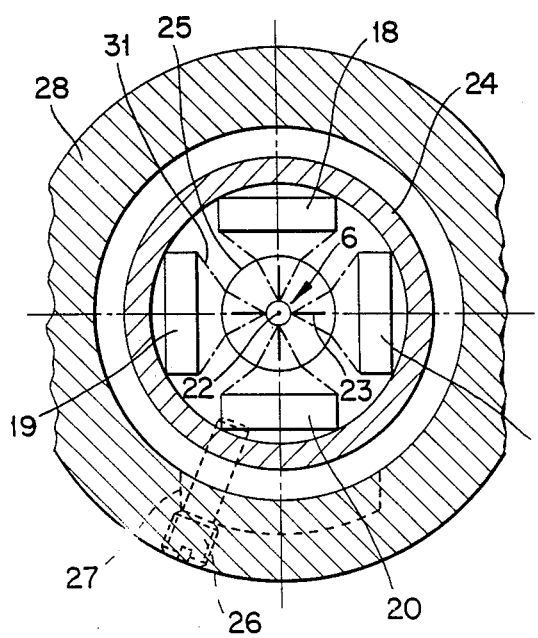
FIG. 3 is a section along A—A of FIG. 2 showing adjustment to maximum illumination.
Figure 4:
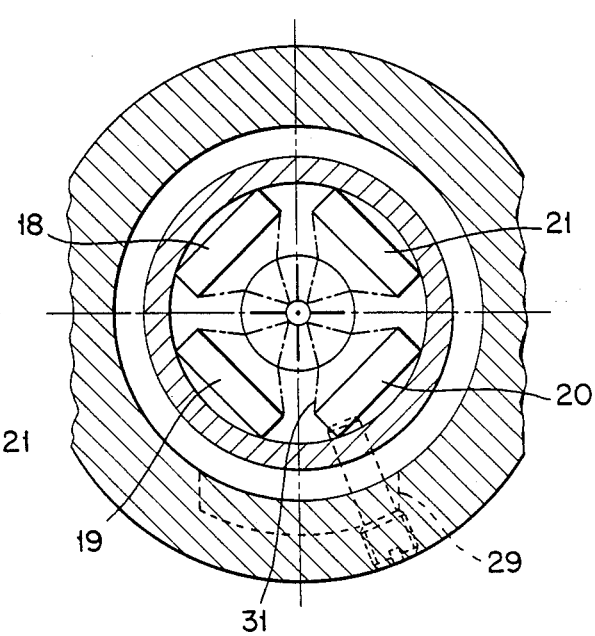
FIG. 4 is a section along A—A of FIG. 2 showing adjustment to minimum illumination.

Beside of the light collecting rod 8 four self contained tritium luminous cells 18, 19, 20, 21 are mounted on a circle around the end surface 11 of the collecting rod 8 for illumination of the aiming mark 6, as shown in detail in FIGS. 3 and 4. The longitudinal sections of FIGS. 1 and 2 show only two tritium cells 18 and 20. As shown in FIGS. 3 and 4, the aiming mark 6 consists of a central circular spot 22 and of four line components 23 arranged radially around the center. The luminous cells 18, 19, 20, 21 are mounted in a housing 24, extending into a central hollow cone 25 (see FIG. 2) that may be rotated with respect to the glass plate 12 with the aiming mark 6 on it. For rotating the luminous cells 18, 19, 20, 21 their housing 24 is connected by a retaining bolt 26 with the transparent hood 10. This hood 10 serves as a turning knob, being rotatably carried by the housing 28 of the second cavity 7. The range of rotation is limited by stops 27, 29 of housing 28 which are shown in FIGS. 3 and 4 by broken lines.

The hollow cone 25, at its truncated top adjacent to the central circular spot 22 of the aiming mark 6 has a small aperture 30. The light collecting rod 8 with its end surface 11 reaches into the hollow cone 25 and illuminates the central circular spot 22 through the aperture 30 of the truncated top of the hollow cone. The external lateral area of cone 25 facing the luminous cells 18, 19, 20, 21 is metallized and serves to direct the emitted light to the corresponding lines 23 of the aiming mark 6 as shown by the broken lines 31 of FIGS. 3 and 4.

By turning the transparent hood 10, as described above, the luminous cells 18, 19, 20, 21 with their radiant cones 31 are shifted relative to the lines 23 of the aiming mark, so that the illumination of the lines 23 varies from a maximum as shown in FIG. 3 to a minimum as shown in FIG. 4.

Figure 5:
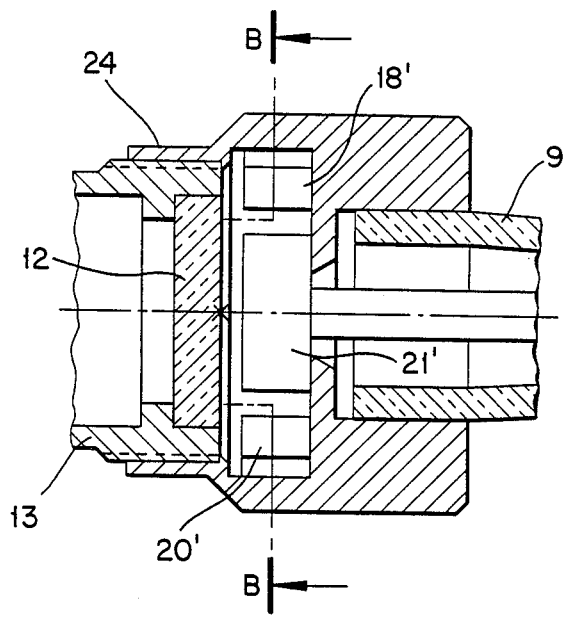
FIG. 5 is a longitudinal section of an alternative illumination of the aiming mark according to FIG. 1
Figure 6:
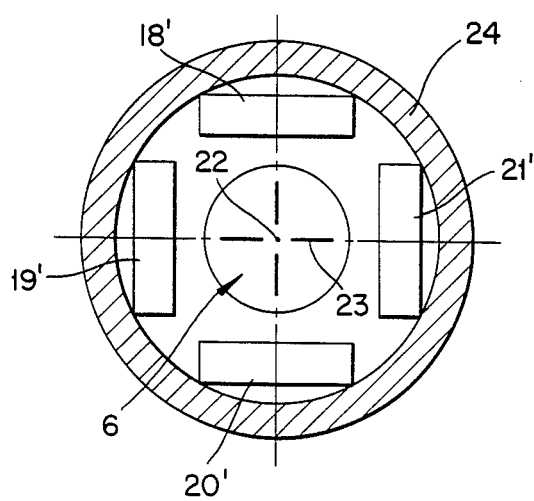
FIG. 6 is a section along B—B of FIG. 5

The variation of illumination of the aiming mark 6 by the luminous cells 18, 19, 20, 21 can be controlled even more effectively by providing the radiant surfaces of the luminous cells with a means to vary attenuation of light along each surface. FIG. 5 shows a tritium luminous cell 21' with a perforated diaphragm on its radiant surface. The holes form a screen on the diaphragm that produces a varying attenuation along luminous cell 21'. The other luminous cells 18', 19', 20' shown in FIG. 6 are also provided with corresponding attenuating screens. Instead of the screen of holes also a screen of spots of varying density or diameter may be used to attenuate the tritium light sources.

The optical aiming device described so far is used in the following way:

Under bright light conditions an observer viewing a target sees a brilliant target image where the central spot 22 of the aiming mark 6 appears with a good contrast due to its bright illumination with ambient light via the light collecting rod 8. Under poor light conditions or at night the target image is much less bright and the central spot 22 of aiming mark 6 is no longer illuminated. In such a case the line components 23 of aiming mark 6 are illuminated by the tritium luminous cells 18, 19, 20, 21 via the mirrored external lateral area of the truncated hollow cone 25 (see FIG. 2). So the lines 23 are used for aiming, while the observer may adapt the brightness of the aiming mark to the brightness of the target simply by rotating the transparent hood 10.

Although the present invention has been described in connection with a preferred embodiment thereof, many other variations and modifications will now become apparent to those skilled in the art. For certain configurations of the aiming mark it may be desirable to provide an illumination that may be varied in a radial direction within the aiming mark 6 by a linear shift of artificial light cells 18, 19, 20, 21 with an appropriate radiation pattern, along the aiming axis 16. A variable illumination of the aiming mark may also be achieved by a relative motion between the cells 18, 19, 20, 21 and the mirrored cone where the mirrored cone 25 has a varying reflectivity along its lateral surface. The aiming mark 6 described in connection with FIG. 2 may also be projected obliquely from the observer's side into the aiming ray path via a partially-reflecting front lens. With such a construction, known as such e.g. from European Patent Application No. 0 069 575 of R. G. Budden and F. Scott the partially reflecting front lens incorporates the functions of partially reflecting mirror 5 and lens 15 of the embodiment described above.

It is preferred, therefore, that the present invention be limited not by the specific disclosure herein, but only by the appended claims.

What is claimed is:

1. Optical aiming device comprising:

first means for viewing a target field along an optical path, comprising a partiallyreflecting mirror, second means defining an aiming mark, comprising at least one first source of artificial light to illuminate said aiming mark, reflecting means for directing the artificial light of said first source to said aiming mark, and means for superimposing light from said illuminated aiming mark on the optical path from the target field via said partiallyreflecting mirror whereby the image of said aiming mark can be seen by an observer, viewing the target field, substantially at infinity, and means for moving at least one of said first source of artificial light, aiming mark and reflecting means with respect to the two other elements so that the illumination intensity of at least part of said aiming mark varies with such motion.

2. Optical aiming device according to claim 1, wherein said at least one first source of artificial light is self-contained, wherein at least one other source of light for illumination of said aiming mark comprises a phosphor that may be activated by daylight, and wherein a part of the aiming mark is illuminated by said source of light comprising said phosphor which may be activated by daylight, and another part of the aiming mark is illuminated by said first source of artificial light.

3. Optical aiming device according to claim 2, wherein said aiming mark comprises a central circular spot and several line components arranged radially around said central spot, and wherein said reflecting means for directing the artificial light of said first source to said aiming mark is constituted by the lateral area of a truncated hollow cone having a small aperture which is adjacent to said circular spot of the aiming mark and serves to pass the illumination from the other source of light that may be activated by daylight, said lateral area being metallized on its outer side and for each line component of the aiming mark one self contained source of artificial light being provided circularly movable around said truncated hollow cone so that the illumination of said line components via said metallized lateral area varies with motion of the self contained sources of artificial light.

4. Optical aiming device according to claim 3, wherein the other source of light, which comprises said phosphor which may be activated by daylight, comprises a rod-shaped phosphor which collects ambient light and transmits it directionally from an end surface adjacent to said circular spot of the aiming mark through said small aperture of the lateral area of the truncated hollow cone.

5. Optical aiming device according to claim 3, wherein said self contained sources of artificial light comprise at their radiant surfaces means which effect an attenuation of light which varies along their radiant surfaces so that on said circular motion of the self contained sources various parts of said radiant surfaces with various luminous intensities become effective for illumination of said parts of the aiming mark.

6. Optical aiming device according to claim 5, wherein said means for variable attenuation of light are diaphragms with a screen of holes or opaque areas.

7. An optical aiming device, comprising:
means for viewing a target along an optical path;
means defining an aiming mark;
a source of artificial light;
reflecting means for directing the artificial light from said source to said aiming mark to thereby illuminate said mark;
means for superimposing an image of said illuminated mark on said optical path to thereby enable a viewer to simultaneously observe a target and said aiming mark; and
means for adjusting the relative positions of said source of light, said aiming mark and said reflecting means to vary the magnitude of illumination of said mark by said source of artificial light.

8. An optical aiming device, comprising:
means for viewing a target along an optical path;
means defining an aiming mark made up of a central spot portion and at least one line portion extending outwardly from said spot;
means activatable by daylight for illuminating said central spot portion of said aiming mark;
a source of artificial light;
reflecting means for directing the artificial light from said source to said line portion of said aiming mark to thereby illuminate said line portion of said mark;
means for superimposing an image from said aiming mark on said optical path to thereby enable a viewer to simultaneously observe a target and said aiming mark; and
means for adjusting the relative positions of said source of artificial light, said aiming mark and said reflecting means to vary the magnitude of illumination of said line portion of said mark by said source of artificial light.

* * * * *